United States Patent [19]
Pelsor

[11] Patent Number: 5,960,740
[45] Date of Patent: Oct. 5, 1999

[54] SPLASH AND SPILL-RESISTANT CONTAINER FOR ANIMAL USE

[76] Inventor: Charles L. Pelsor, 1060 McMakin-McMillen Rd., Shelbyville, Ky. 40065

[ * ] Notice: This patent is subject to a terminal disclaimer.

[21] Appl. No.: 09/234,949

[22] Filed: Jan. 21, 1999

Related U.S. Application Data

[63] Continuation-in-part of application No. 08/964,173, Nov. 4, 1997, Pat. No. 5,881,670.

[51] Int. Cl.$^6$ ............................... A01K 5/01; A01K 7/04
[52] U.S. Cl. .................................... 119/61; 119/72
[58] Field of Search .................. 119/52.1, 52.2, 119/57.8, 57.9, 61, 72, 73; 220/731, 374, 560.03, 571, 719

[56] References Cited

U.S. PATENT DOCUMENTS

| | | |
|---|---|---|
| 995,415 | 6/1911 | Steel ................................... 220/731 X |
| 2,810,491 | 10/1957 | Goldschmidt ....................... 220/719 X |
| 3,076,435 | 2/1963 | Seymour ..................................... 119/61 |
| 3,152,576 | 10/1964 | Faurot ........................................ 119/61 |
| 3,759,228 | 9/1973 | Keen ......................................... 119/79 |
| 4,646,682 | 3/1987 | Wilson ........................................ 119/1 |
| 4,714,174 | 12/1987 | Williams ................................. 220/719 |
| 5,002,017 | 3/1991 | Hollyday et al. ......................... 119/73 |
| 5,297,504 | 3/1994 | Carrico .................................... 119/61 |
| 5,791,287 | 8/1998 | Gruber . |

*Primary Examiner*—Thomas Price
*Attorney, Agent, or Firm*—King and Schickli

[57] ABSTRACT

An improved splash and spill-resistant container for holding a fluid for consumption by an animal is disclosed. The container forms a cavity with a top access aperture which defines an inverted channel. A partition divides the cavity into first and second chambers. The partition curves downward from the periphery substantially to the floor of the container and is provided with a flow aperture, thereby allowing fluid communication between the first and second chambers. A valve is also provided to release air from the second chamber. After filling the container with a volume of fluid, the container may be subjected to lateral jarring or inverted without spilling the fluid contained therein.

20 Claims, 5 Drawing Sheets

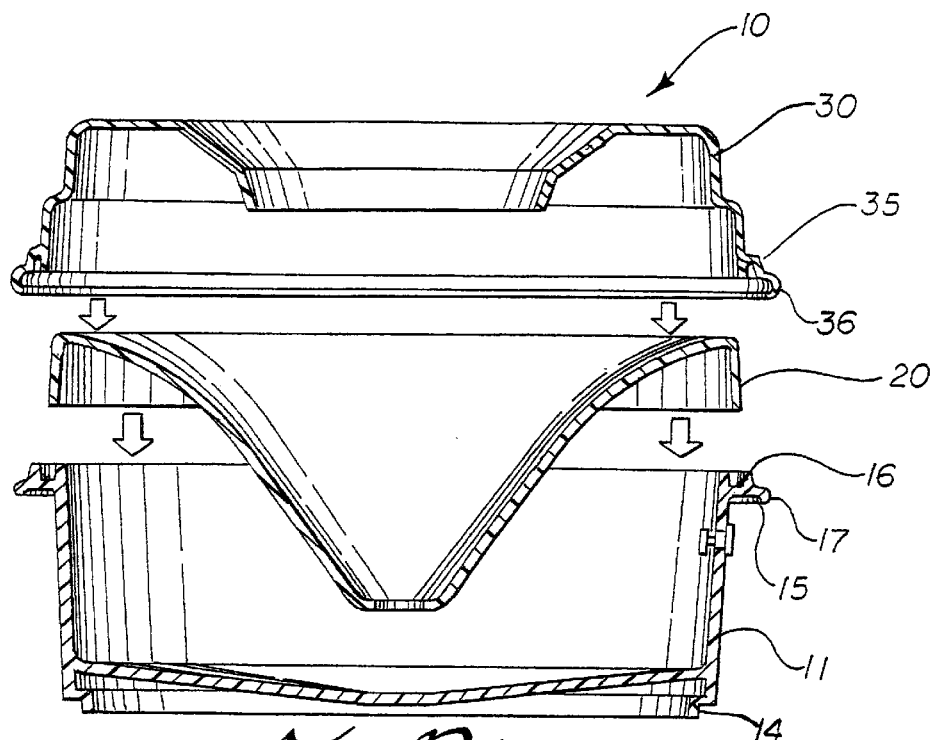
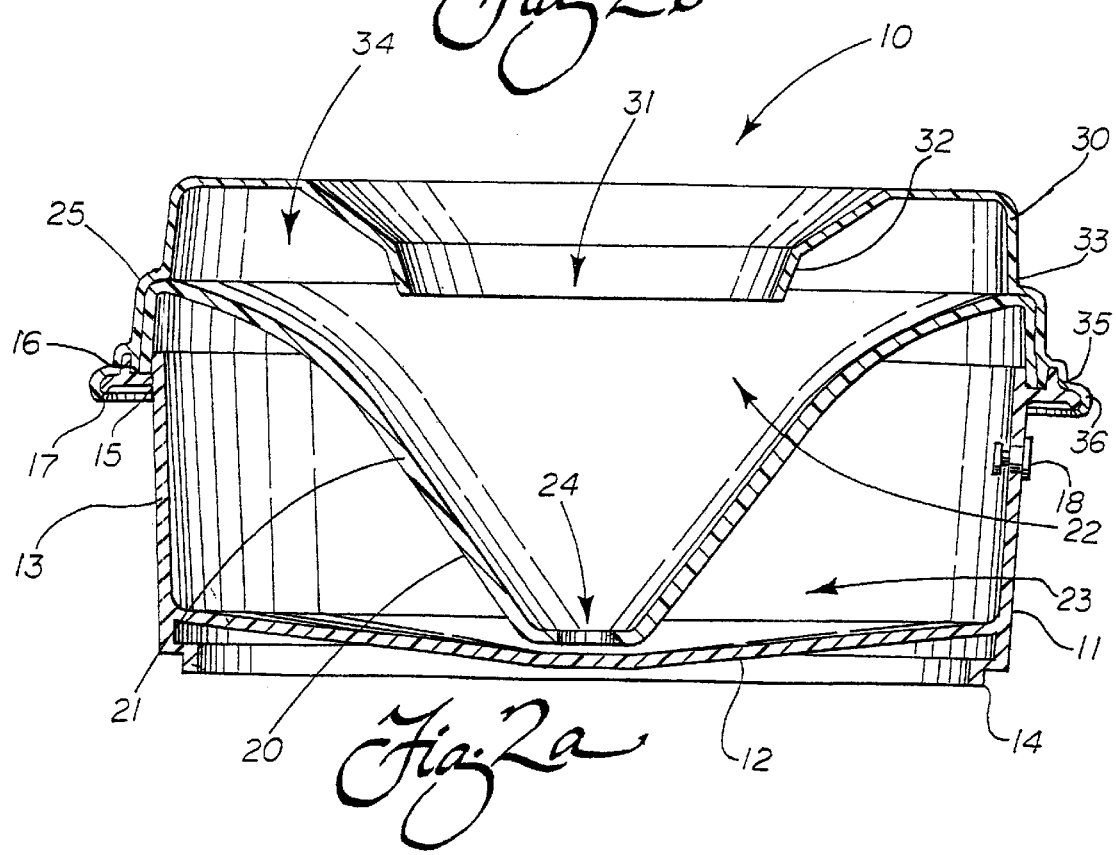

SPLASH AND SPILL-RESISTANT CONTAINER FOR ANIMAL USE

This application is a Continuation-in-Part of Ser. No. 08/964,173, filed Nov. 4, 1997, now U.S. Pat. No. 5,881,670 entitled "Splash and Spill-Resistant Container for Animal Use."

TECHNICAL FIELD

The present invention relates generally to the container art and, more particularly, to an improved splash and spill-resistant container for holding fluids for animal consumption.

BACKGROUND OF THE INVENTION

The consumption of water or other fluids is essential to the health, livelihood, and general well-being of all wild and domestic land animals. However, unlike their wild counterparts, house-hold pets and other confined animals are generally ill-equipped to seek out and obtain such fluids. Accordingly, such animals rely on humans to provide the same.

The general mode of providing animals with fluids is through containers such as a simple dog dish, an old bowl or the like. Of course, these dishes and bowls are often hemispherical in shape and, although easily filled with fluid and accessed by an animal, are prone to allowing significant splashing and spillage when an animal or human caretender inadvertently comes into physical contact with the exterior of the bowl. This is especially true for some animals, such as large dog breeds, which may accidentally step on the perimeter of the bowl or kick the bowl, thereby causing it to flip over and spill the fluid contents on the ground. Even specially contoured one-piece pet bowls formed of molded plastic that are well-known in the art (see, for example, U.S. Pat. No. 3,772,476 to Van Ness et al.), suffer from similar splash and spillage problems.

During extended trips, animals require fluid nourishment to maintain comfort and well-being. This often results in a significant number of inconvenient stops being made to provide the animal with sufficient amounts of fluid. As can be appreciated, this extra stopping can substantially increase the required travel time. Furthermore, some animals, such as dogs employed in law enforcement operations, may spend many hours per day, several days per week in a vehicle, and will require a constant supply of fluids to remain healthy.

In the typical vehicle, such as a car, truck, boat, or plane, the only suitable location to place such a container is on the floor. As can be appreciated, the motion of the vehicle during operation creates significant jarring which will inevitably create waves or ripples in the fluid. These waves or ripples in turn will likely cause the fluid to splash or spill from any standard container. Furthermore, during emergency stopping or swerving, the container may flip over or invert, thus causing the entire contents to empty onto the floor of the vehicle, an obviously undesirable situation.

Previously, others have proposed a variety of containers for holding fluids for animal consumption in an attempt to overcome this problem. A basic example of such a container is found in U.S. Pat. No. 3,152,576 to Faurot. The container disclosed in the '576 patent is provided with a flat frusto-conical wall extending partially into the cavity of the container to prevent water from spilling if the container is tilted. However, this proposed design has several shortcomings. For instance, the amount of fluid that can be held is extremely limited. If the container is filled beyond the aperture in the frusto-conical wall, the fluid will easily spill upon tipping or inversion. Furthermore, even if the amount of fluid is limited as shown, nothing prevents the fluid from splashing out of the container if significant lateral jarring occurs.

U.S. Pat. No. 3,076,435 to Seymour discloses a container with an exchange system that allows fluid held in a reservoir to continuously refill into a chamber as an animal imbibes the fluid. Although this design attempts to solve the problem of splashing created by lateral jarring and tilting, it is apparent that fluid held within the reservoir easily spills out onto the floor if the container is inverted or tipped beyond a specified angle. Therefore, at best, this design can be said to only minimize spillage under certain limited conditions.

U.S. Pat. No. 5,297,504 to Carrico discloses a container having an internal dish for holding fluid, the dish being in fluid conimunication with the surrounding housing. While the housing includes an inverted channel for catching fluid upon the inversion of the container, the entire volume of fluid in the container must be caught. This limits the effectiveness of this design to prevent inadvertent spills and the volume of fluid which may be held.

Finally, U.S. Pat. No. 5,791,287 to Gruber discloses a container that utilizes a floating dish to minimize splashing created by lateral jarring. This is similar in concept to the container shown in U.S. Pat. No. 4,286,546 to Moore, which also proposes the use of a floating dish in an effort to prevent splashing. As should be appreciated, neither container would suitably contain the fluid if inversion occurs, as the diameter of the floating dish in both instances is slightly less than the diameter of the body of the container and, thus, would allow fluid to pass thereby and out of the container. Thus, these containers can at best be termed splash, and not spill, resistant.

Accordingly, a need is identified for an improved splash and spill-resistant container for holding fluids for animal consumption that may be subjected to significant lateral jarring without fluid splashing, that may be inverted without spilling the fluid contents and that is of simple, yet durable, construction.

SUMMARY OF THE INVENTION

Keeping the above needs in focus, it is a primary object of the present invention to provide a container for animal use that prevents an amount of fluid being held in the container from splashing or spilling therefrom.

It is a further object of the present invention to provide such a container that can withstand significant lateral jarring without a fluid contained therein splashing out.

Still a further object of the present invention is to provide such a container with separate chambers for catching and holding fluid when the container is partially or completely inverted without spilling the fluid contained therein.

Yet another object of the present invention is to provide such a container that is of simple, yet durable, construction and is easily and inexpensively manufactured.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a splash and spill-resistant container is provided for holding a fluid, such as water, for animal consumption. In the preferred embodiment, the container is formed of a base defining a cavity for holding fluid, a partition for dividing the cavity into first and second chambers, and a housing having an aperture for accessing fluid held in the first chamber. As will be appreciated upon reviewing the disclosure which follows, the cooperation of these components advantageously provides a container for animal fluid that can withstand significant lateral jarring, or even inversion, without spilling any appreciable amount of its fluid contents.

More specifically describing the components forming the container, the base includes a concave floor and an upstanding side wall. The side wall terminates in a peripheral ledge having a groove for accepting the other components of the container.

The partition fits mates in sealing engagement with the base and is preferably inverted and frusto-conical. In the preferred embodiment, the partition extends downward toward the floor of the base so as to divide the cavity into the two above-mentioned chambers. A flow aperture is formed in the center of the frustum of the cone that forms the partition to allow fluid to communicate between the two chambers. Preferably, the partition is formed such that upon attachment to the base, the access aperture is positioned just above the floor of the base. Additionally, an external flange is formed in the periphery of the partition. This flange mates with the groove formed in the ledge of the base, thereby providing the desired sealing engagement to prevent fluid from escaping.

The housing is securably attached over the base and partition. Located in the center of the housing is an access apertures that allows an animal to drink the fluid held in the first chamber of the container. Although not critical to the invention, it is preferred that the outer periphery of the housing is provided with a stepped flange having a corresponding inverted groove for mating with the outermost upstanding member of the groove of the base. Further, the stepped flange terminates in a flap, which ideally extends over and couples with the ledge formed along the periphery of the side wall of the base, thereby forming a substantially fluid-impervious seal. A handle may optionally be provided to facilitate removal of the housing for filling, emptying, or cleaning the components forming the container.

A portion of the housing is preferably of inverted frusto-conical shape so that it extends partially into the first chamber and forms an internal downturned flange that defines the access aperture. As should be appreciated, this flange advantageously prevents fluid from splashing outside of the first chamber of the container during lateral jarring. It is the combination of the internal downturned flange and the stepped flange that forms the inverted channel or chamber that catches and holds fluid when the container is partially or fully inverted. In order to accomplish this, the inverted channel preferably has a volume A that is equal to or greater than the volume B of the first chamber.

To fill the container, the housing and partition may be removed, the base filled with fluid, and the housing and partition replaced. Alternatively, the container may include a valve to facilitate filling of the container without requiring disassembly. As the second chamber is ideally sealed, this valve advantageously allows air to quickly escape the second chamber during filling. Preferably, the valve is positioned above a predetermined preferred fluid level that allows the fluid to pass through the access and flow apertures and into the second chamber. The valve may be formed in the side wall of the base or, alternatively, may extend through the partition. Preferably, the valve is a one-way valve that allows air, but not fluid, to pass out of the second chamber. However, it is within the broadest aspects of the invention to simply include a small hole that would allow air to flow into the second chamber, while possibly permitting a minimum amount of fluid to escape. Also, it is the function of allowing air to escape from the second chamber that is important and, thus, any mechanism that could perform this function, whether positioned above or below the preferred level of fluid, could be used.

Advantageously, upon the inversion of the container, any fluid in the first chamber of the base is diverted by the partition into the inverted channel formed in the housing. In the preferred embodiment, the inverted frusto-conical partition is provided with a curvature that assists in creating ideal fluid flow along the partition. Specifically, upon inversion of the container, this curve acting in conjunction with the surface tension and waveform of the fluid advantageously causes the fluid to flow down the partition into the inverted channel or chamber provided by the housing. As can be appreciated, this controlled fluid flow substantially prevents any spillage or splashing through the access aperture in the housing. It should also be appreciated that during inversion, all fluid residing in the second chamber formed by the partition flows down the backside of the partition, where it is trapped in the top of this second chamber. Thus, as should now be realized, the container advantageously can be completely inverted without any appreciable fluid spillage occurring, which makes the container of the present invention unique relative to prior art containers and ideal for use in household settings, vehicles, or in all other situations where the container is subject to significant lateral jarring or inversion.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming apart of the specification, illustrate several aspects of the present invention and, together with the description, serves to explain the principles of the invention.

In the drawings:

FIG. 2a is a cross-sectional view of the container showing the base, the inverted frusto-conical partition, and the inverted frusto-conical housing, including access aperture and internal downturned flange;

FIG. 2b is a schematic view showing the inter-fitting of the components to form a first embodiment of the container of the present invention;

Reference will now be made in detail to the present preferred embodiment of the invention, an example of which is illustrated in the accompanying drawings.

DETAILED DESCRIPTION OF THE INVENTION

Figure 1:
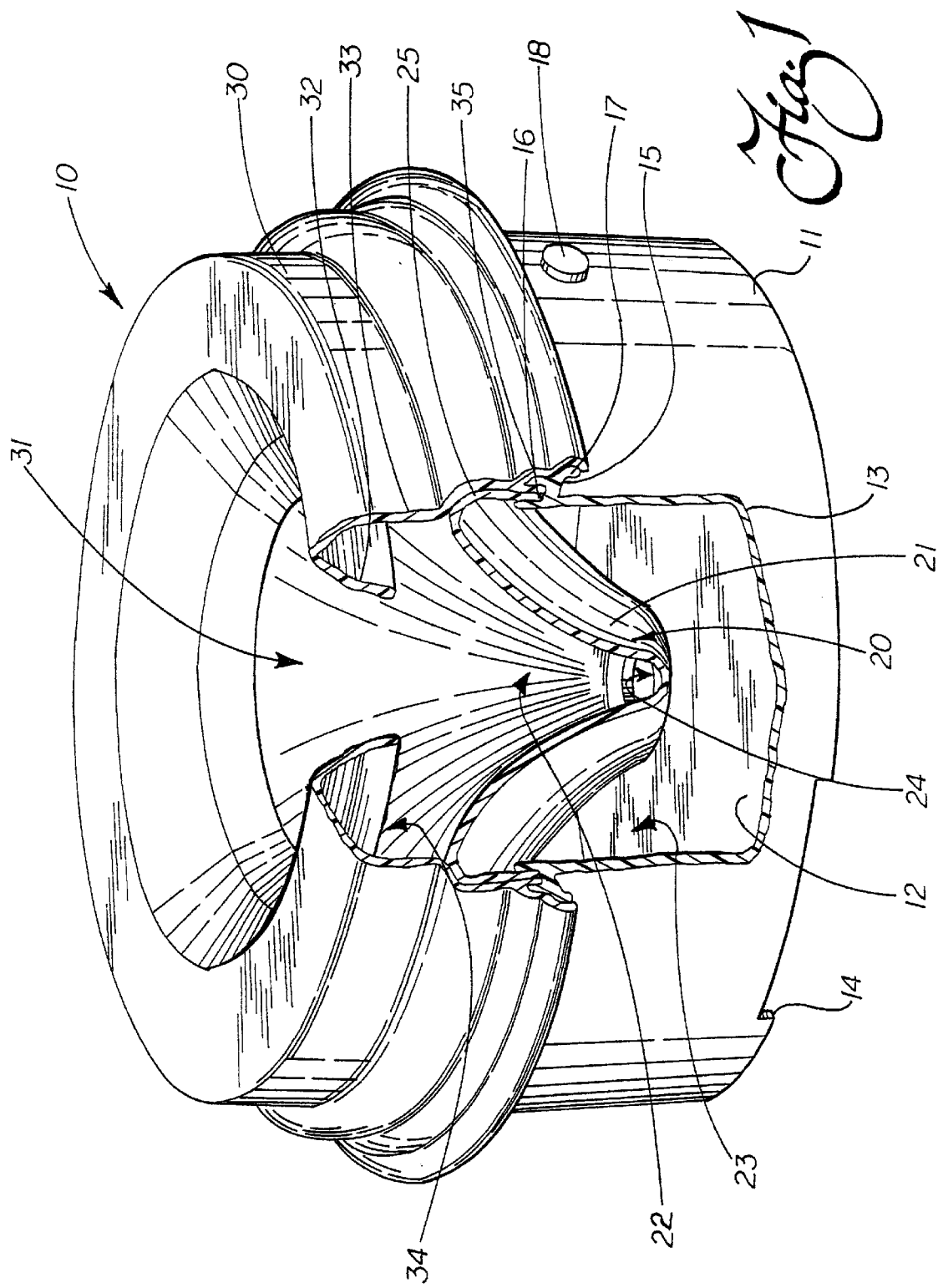
FIG. 1 is a perspective view of a filly assembled splash and spill-resistant pet container constructed in accordance with the principles of the present invention, with a cutaway view showing the base, the inverted frusto-conical partition, and the inverted frusto-conical housing, each mating in sealing engagement.

Reference is now made to FIGS. 1 and 2a, showing a splash and spill resistant container 10 constructed in accordance with the principles of the present invention. For purposes of illustration only, a circular container is shown, although modifications to the shape are possible without departing from the broadest aspects of the invention. In the illustrated embodiment, the container 10 is formed of three separate sections or components. A base 11 having a floor 12 and an upstanding side wall 13 forms an open-top cavity for holding fluid. The floor 12 is substantially concave relative to the horizontal plane (see FIG. 2a) and, thus, the base 11 is provided with a peripheral support flange 14 extending downward from the floor. As can be appreciated, this support flange 14 acts to elevate the center depression of the concave floor above ground level and, thus, provide stability to the container 10 in the resting position. A peripheral ledge 15 extends substantially perpendicularly from the side wall. The upstanding side wall 13 also continues beyond ledge 15 and, coupled with a member extending upwardly from the top surface of the ledge 15, forms a U-shaped mating groove 16. To assist in holding the other components of the container 10 together, a lip 17 is formed in the outer portion of the ledge 15.

In the embodiment illustrated in FIGS. 1–3, a valve 18 is provided through the upstanding side wall 13 in base 11. This valve 18 is positioned above a preferred fluid level, as will be described in more detail below. For purposes of illustration, the valve 18 is shown as a rubber stopper of simple construction, although other types of valves that are well-known in the art are contemplated, such as push-button bleeder valves or the like. Furthermore, as described below and illustrated in FIGS. 4–6, it is possible to place the valve 18 at other locations, the only requirement being that the valve 18 permit air to escape without allowing any appreciable fluid spillage.

A partition 20 having an inverted frusto-conical wall 21 fits onto base 11. As illustrated, this frusto-conical wall 21 curves from the periphery downward into the center of the base 11, stopping just above the floor 12. In this manner, the partition 20 divides the cavity formed by base 11 into an inverted, substantially conical first chamber 22 and an annular second chamber 23. A flow aperture 24 at the bottom of the frustum of the partition 20 allows fluid to communicate between the first and second chambers 22,23. Extending from the external periphery of the partition 20 is a mating flange 25 for insertion into the U-shaped mating groove 16 of base 11. Ideally, the width of the U-shaped mating groove 16 is approximately twice the width of the mating flange 25, thereby allowing the housing 30 to sealingly couple with the base 11, as is described more particularly below.

The container 10 also includes an inverted frusto-conical housing 30 that fits atop partition 20 and is secured to the base 11. An access aperture 31 is formed in the center of the frusto-conical portion of the housing 30. As can be appreciated from viewing FIG. 1, the access aperture 31 is of sufficient diameter to allow an animal to access fluid F held in the first chamber 22, and in the preferred embodiment is approximately five times larger than the flow aperture 24 of partition 20.

Housing 30 forms an internal downturned flange 32 that extends partially into the first chamber 22. An external stepped flange 33 forms the outer wall of housing 30. The internal downturned flange 32 and the external stepped flange 33 together form an inverted channel 34. Also, an inverted U-shaped mating groove 35 is provided in the stepped flange 33 for coupling with the outermost upstanding member forming U-shaped mating groove 16 in peripheral ledge 15 of base 11. As noted above, this mating groove 16 also acts to hold mating flange 25 of partition 20. Extending from the outermost portion of the inverted U-shaped mating groove 35 is a flap 36 shaped to interlock with lip 17 in ledge 15, thereby providing a substantially fluid-impervious seal.

As can be appreciated from viewing FIG. 2b, the above-referenced series of mating grooves 16, 35 and flanges 25, 33 advantageously provide the container 10 with a snap-fit assembly of simple construction and provide a substantially fluid-impervious seal. Specifically, the mating flange 25 of partition 20 is inserted in the U-shaped mating groove 16 of base 11, as indicated by the lower set of action arrows in FIG. 2b. Housing 30 is fitted over partition 20 such that inverted U-shaped mating groove 35 couples with the U-shaped mating groove 16 of base 11 in an off-set position, as indicated by the upper set of action arrows in FIG. 2b. The flap 36 in housing 30 is then snapped over the lip 17 extending from ledge 15 to complete the construction of the container 10.

Figure 3A:
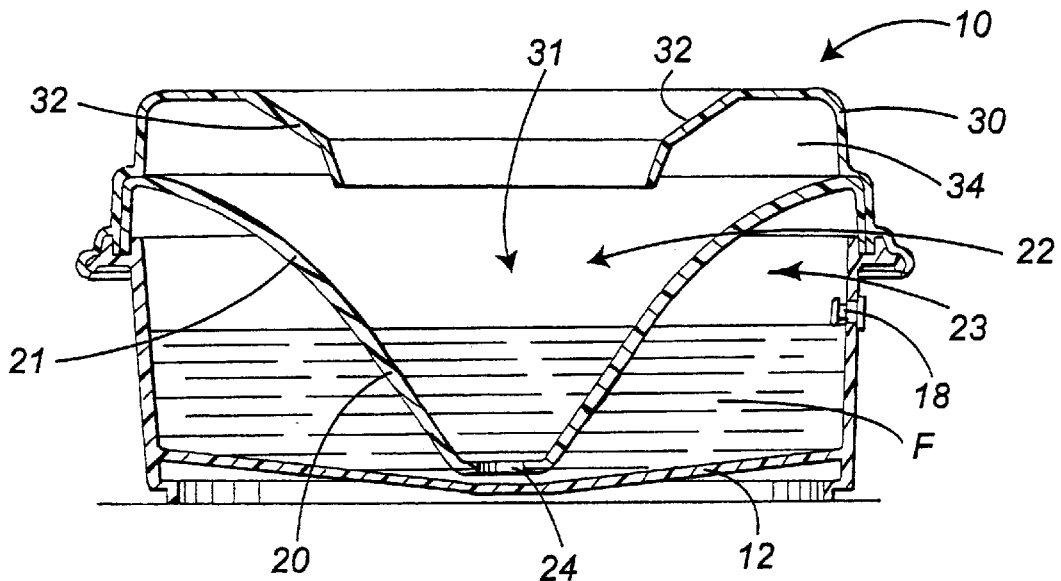
FIGS. 3a, 3b, 3c, and 3d are progressive views showing the action of a fluid held within the container during various stages of rotation, including the complete inversion of the container.

As is shown in FIG. 3a, after assembly, the container 10 is filled with the desired fluid F through the access aperture 31. As can be appreciated, the fluid F flows downwardly along the frusto-conical wall 21 of the first chamber 22, through flow aperture 24, and into second chamber 23. As it is contemplated that the interfitting of the components of the container is such that a substantially fluid-impervious seal is formed, it may be necessary to either remove the partition 20 and housing 30, fill the base 11 with fluid F, and reassemble the components to form the container 10. Optionally, as noted above, a valve 18 may be provided at some point above the preferred fluid level to release air from the second chamber 23 as fluid is poured through the access aperture 31 and flow aperture 24 into the second chamber 23. Filling is completed until a predetermined level of fluid F is reached in the first chamber 22, as can be viewed through access aperture 31.

In the horizontal position, the fluid F in the container 10 resides in an equilibrium state between the first 22 and second chambers 23 and, thus, may be easily accessed by a thirsty animal through access aperture 31. If no valve 18 is provided and an otherwise air-tight seal is formed between the components, the animal must imbibe the fluid F from the first chamber 22 until the fluid level drops below the level of the flow aperture 24 thereby allowing the passage of air into the second chamber 23. As a result, fluid F then flows from the second chamber 23 into the first chamber 22 until an equilibrium state is again established. In this way, fluid F is always maintained in the first chamber 22 for consumption by the animal.

If the container 10 is subjected to lateral jarring from accidental bumping or kicking or if significant vibrations are created by vehicle travel or the like, the inverted frusto-conical wall 21 of partition 20 acts to negate fluid splashing. Specifically, the curvature of the frusto-conical wall 21 promotes a smooth wave flow for the fluid F held in the first chamber 22 during lateral jarring. This maintains the body of fluid intact and in the bottom center of first chamber 22. The internal downturned flange 32 of the housing 30 also prevents any stray or free drops of fluid from splashing from container 10.

Figure 3B:
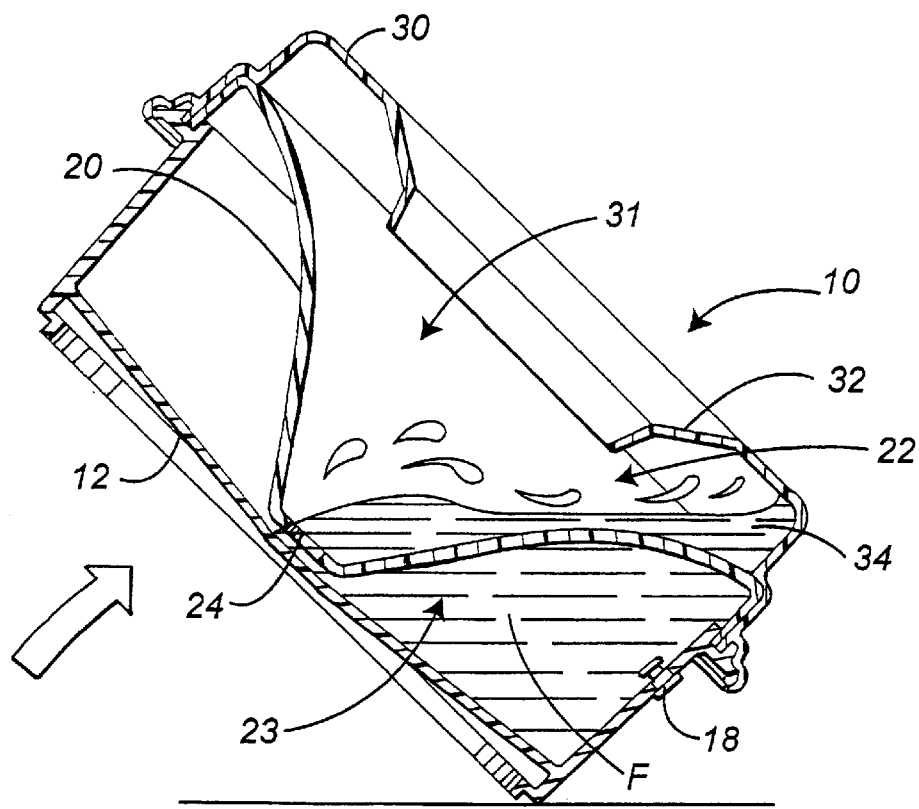
Figure 3C:
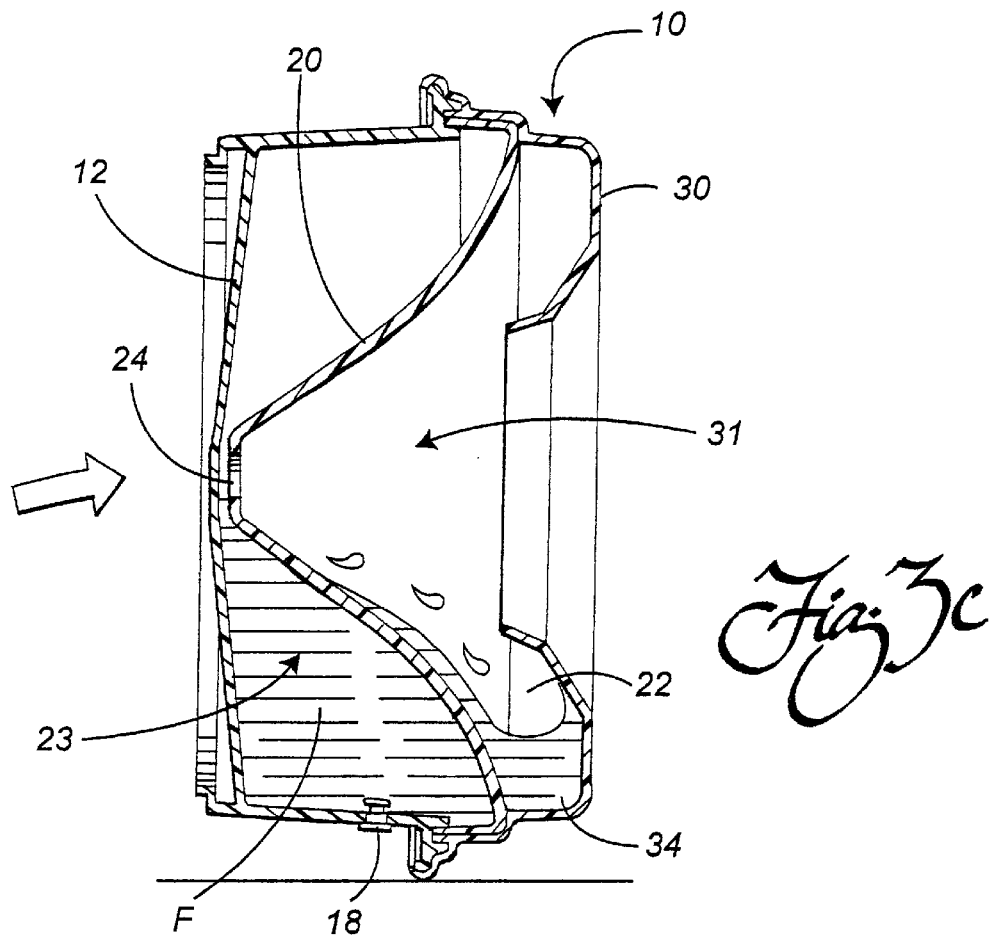
Figure 3D:
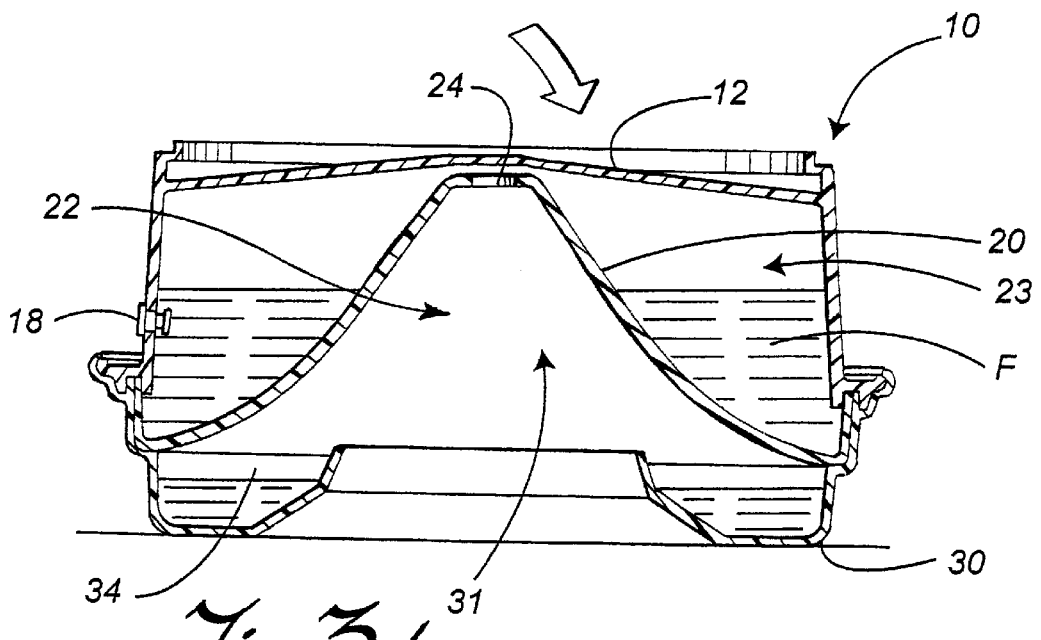

Referring now to FIGS. 3b, 3c, and 3d, the splash and spill-resistant characteristics of the container 10 of the present invention are demonstrated. Specifically, as seen in FIG. 3b, when the container 10 is tilted, the fluid F held in the first chamber 22 flows along the curve of the frusto-conical wall 21. Ideally, the wall 21 is provided with a specific degree of curvature such that the fluid F, primarily by virtue of its inherent surface tension, is inclined to maintain itself in a single body and flow along said curve to an equilibrium position. Although a numerous degrees of curvature will provide this or similar benefits, it has been found that the ideal fluid flow on inversion is provided by a curve that has a degree of curvature substantially in the form of an inverted hyperbolic secant curve, although the use of other forms of secant-like curves, such as a tractrix, is also contemplated. These geometric configurations are used only to describe the shape of the curve formed by partition 20, and are not meant to require some form of mathematical accuracy in constructing the partition. The main requirement is that the curve promotes the flow of fluid along the partition 20 and into the channel 34 if the container 10 is inverted.

As is now realized, during the tilting of the container 10, fluid F flows from a resting position in the first chamber 22 to the inverted channel 34 of housing 30. Similarly, the fluid F resting in equilibrium in the second chamber 23 flows around the annulus of base 11 to fill one side of the second chamber 23 formed by partition 20. As the seals between the components are impervious to fluid flow, it is now realized that no fluid F is lost through these connections at any stage of inversion.

Continuing the tilting motion until the container 10 is normal to the ground, fluid F flows from the first chamber 22 to the inverted channel 34 and from the high side of the second chamber 23 to the lower side. Again, the inherent surface tension of the fluid F, coupled with the curvature of the frusto-conical wall 21, causes the fluid to follow itself along the partition 20 and into the desired positions. Also, as can be appreciated, the fluid F is also displaced laterally along the semi-annular inverted channel 34 and the annular second chamber 23 so as to avoid any overflow through the access aperture 31.

In the fully inverted position, the fluid F continues to laterally displace until a position of forced equilibrium is reached. The volume of fluid F previously contained in the first chamber 22 now fully rests in the inverted channel 34 of housing 30. Likewise, the volume of fluid F in the second chamber 23 now rests in the top portion of the chamber. Thus, as is now realized, the container 10 is completely and fully inverted and no fluid F is splashed or spilled outside of the container 10.

To right the container 10 from the inverted position, it is simply flipped over in any desired manner. The fluid F follows the same path as upon inversion until the respective equilibrium positions are reached; that is, the fluid in the inverted channel 34 flows along the curve of frusto-conical wall 21 into first chamber 22, and the fluid pooled in the top of the second chamber 23 returns to the bottom along the floor 12.

During inversion of the container 10, additional air may flow into the second chamber 23 through flow aperture 24. Due to the sealed nature of this chamber 23, this air may cause a temporary equilibrium imbalance between the first and second chambers 22, 23, thus delaying the fluid F from returning to desired relative levels. Although no spillage is created by this delay, valve 18 may be used to release any air that may cause this impeded flow and return some of the fluid F from the first chamber 22 to the second chamber 23. Alternatively, if some form of automatic valve arrangement is used (not shown), the air may automatically escape from the second chamber 23, thereby allowing an equilibrium state to be quickly achieved.

As may now be realized, to provide the greatest amount of spill resistance, the ideal volume of fluid held in the first chamber 22 is limited by the maximum volume of the inverted channel 34 in housing 30. As the fluid level in the first chamber 22 is directly dependent on the level of fluid in the second chamber 23 due to the fact that the flow aperture 24 allows an equilibrium position to be established between these chambers, there is obviously a preferred volume of fluid held in the container for optimum performance. Ideally, the ratio of the preferred volume of the first chamber 22 to second chamber 23 is approximately 1:33. Of course, while maintaining this ratio, it is possible to vary the dimensions of container 10 to hold from several ounces of fluid to several gallons while retaining the splash and spill resistant characteristics. Furthermore, it is contemplated that the inverted channel 34 may be oversized to accommodate a greater volume of fluid without affecting the splash and spill-resistant characteristics of the container.

For smaller animals or for household pet use, the container 10 is preferably made of a lightweight plastic material, such as polyethylene, polypropylene, or the like. Containers formed of such materials by plastic working processes are well-known in the art. For larger animals, such as horses, the use of other, more durable materials, such as heavy-duty molded plastics, stainless steel or the like is contemplated. Also, forming the container 10 of disposable materials, such as styrofoam, waxed cardboard or the like, is also contemplated.

Figure 4:
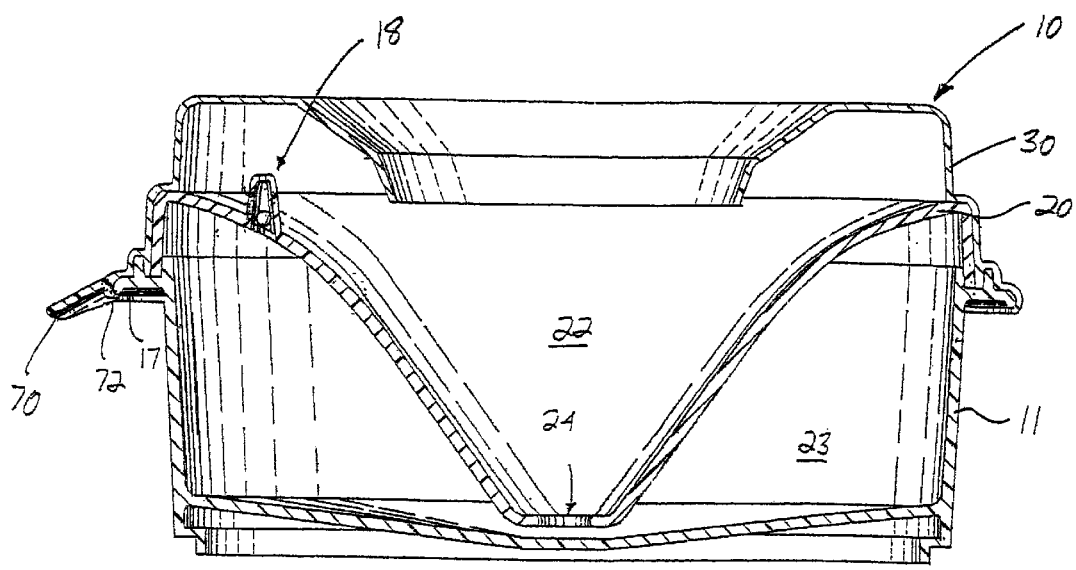
FIG. 4 is a cross-sectional view of a second embodiment wherein a valve is provided in the partition to permit air to escape as the second chamber fills with fluid.
Figures 5A, 5B:
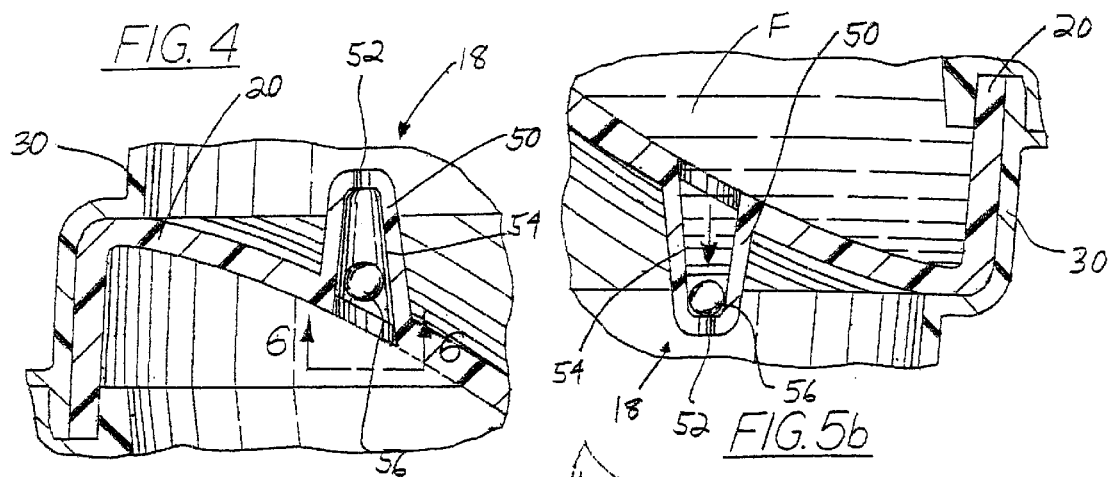
FIG. 5a is an enlarged, cross-sectional view showing the valve extending through the partition, including the ball in the resting position.
FIG. 5b is similar to 5b, but showing the position of the ball when the container is inverted.
Figure 6:
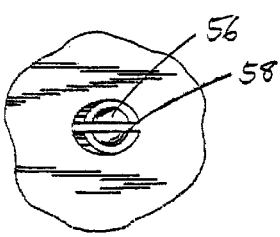
FIG. 6 is a cutaway view of the underside of the partition adjacent the valve, with the ball resting on a support.

A second embodiment of the container 10 is illustrated in FIGS. 4–6. The primary feature of this embodiment is the preferred placement of the valve 18 through the partition 20. Specifically, the valve 18 takes the form of an upstanding finger 50 having an aperture 52 and a conical channel 54 that houses a ball 56. As shown in FIG. 6, a support in the form of a cross-member 58 is provided at the lower portion of finger 50 to trap the ball 56 in the conical chamber 56. Although a cross-member 58 is illustrated, it should be appreciated that any arrangement which traps the ball 56 and allows air to pass from the second chamber 32 could be utilized, such as by providing a circular rim, a two cross-members that extend perpendicular to each other, a grid, undercuts, detents, or the like.

When the container 10 is in the upright position, as illustrated in FIGS. 4 and 5a, the ball 56 rests against the cross-member 58. In this position, the ball 56 allows air to flow out of the second chamber 23, thereby allowing fluid to flow freely through the flow aperture 24 into the second chamber 23. Upon inversion, the ball 56 falls through the conical chamber 54 and comes to rest atop the aperture 52 in finger 50 (see action arrow in FIG. 5b). In this position, the ball 56 prevents fluid F from flowing from the second chamber 23. It should be appreciated that while the ball 56 provides excellent protection against fluid spillage, it is possible to remove the ball 56 from the valve 18 altogether, as only a minimum amount of fluid will flow through the conical channel 54. As any such fluid is caught in the channel 34, a bystander witnessing the inversion would have adequate time to right the container 10 before appreciable fluid spillage occurred.

Figure 7:
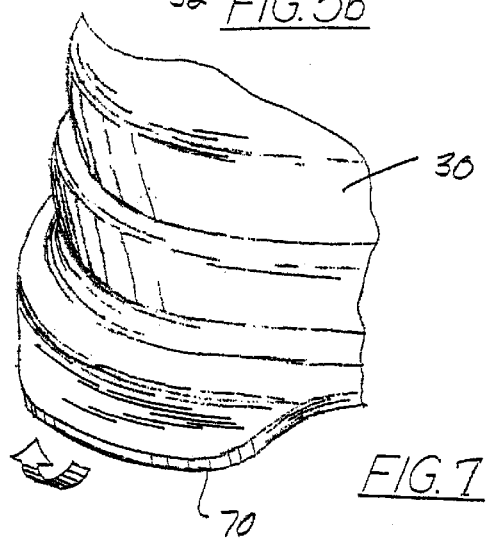
FIG. 7 is a cutaway view of the housing showing in particular the handle to facilitate removal of the housing from the base.

Obvious modifications to the container 10 to facilitate use are also possible. For example, a handle 70 may be provided which is helpful in removing the housing to permit filling, emptying, or cleaning of the container 10. As illustrated in FIGS. 4 and 7, the handle 70 is preferably lever-like and depends slightly from the periphery of housing 30. A depending lip 72 which matches the contour of the lip 17 is also provided to ensure a tight, fluid impervious seal. To remove the housing 30, the handle 70 is simply gripped between the fingers and flexed upwardly (see action arrow in FIG. 7). This serves to break the seal between the depending lip 72 and lip 17 and allows the user to remove the housing 30 from atop the partition 20. Although a handle 70 having a unitary body is shown, it should be appreciated that the handle may be of any shape that provides the desired force to break the seal, such as a U-shape, C-shape, or the like. Additionally, the handle 70 may be provided with fingertip pads (not shown) to aid the user in gripping and pulling upwardly on the handle 70. Finally, the handle 70 may depend downwardly from the housing 30 at any angle which provides the desired benefit, including normal to the ground.

In summary, an improved splash and spill resistant container 10 for holding fluids for pet consumption is disclosed. A base 11 forms an open-top cavity that is divided into a first chamber 22 and a second chamber 23 by a partition 20. A housing 30 resting atop the partition 20 is provided with an access aperture 31 and an inverted channel 34. If the container 10 is filled with a fluid F and subjected to significant lateral jarring or if the container 10 is inverted, the novel arrangement of the chambers 22, 23 and channel 34 prevents fluid F from spilling from the container 10. Furthermore, the container is ideally made of lightweight plastic materials in three sections, such that it may be easily disassembled, cleaned, and reassembled. A valve 18 may be provided that facilitates the filling and emptying of the container 10 with fluid F. The valve 18 extends through either the base 11 or partition 20 at a point above the fluid level to permit air to escape from the second chamber 23. Finally, a handle 70 may be provided to facilitate the removal of the housing 30.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

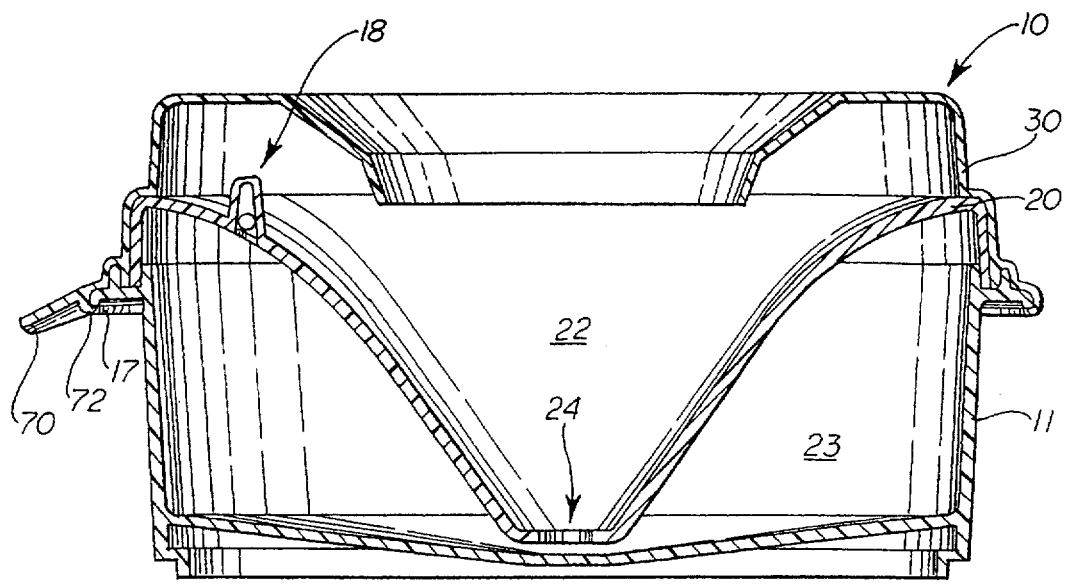
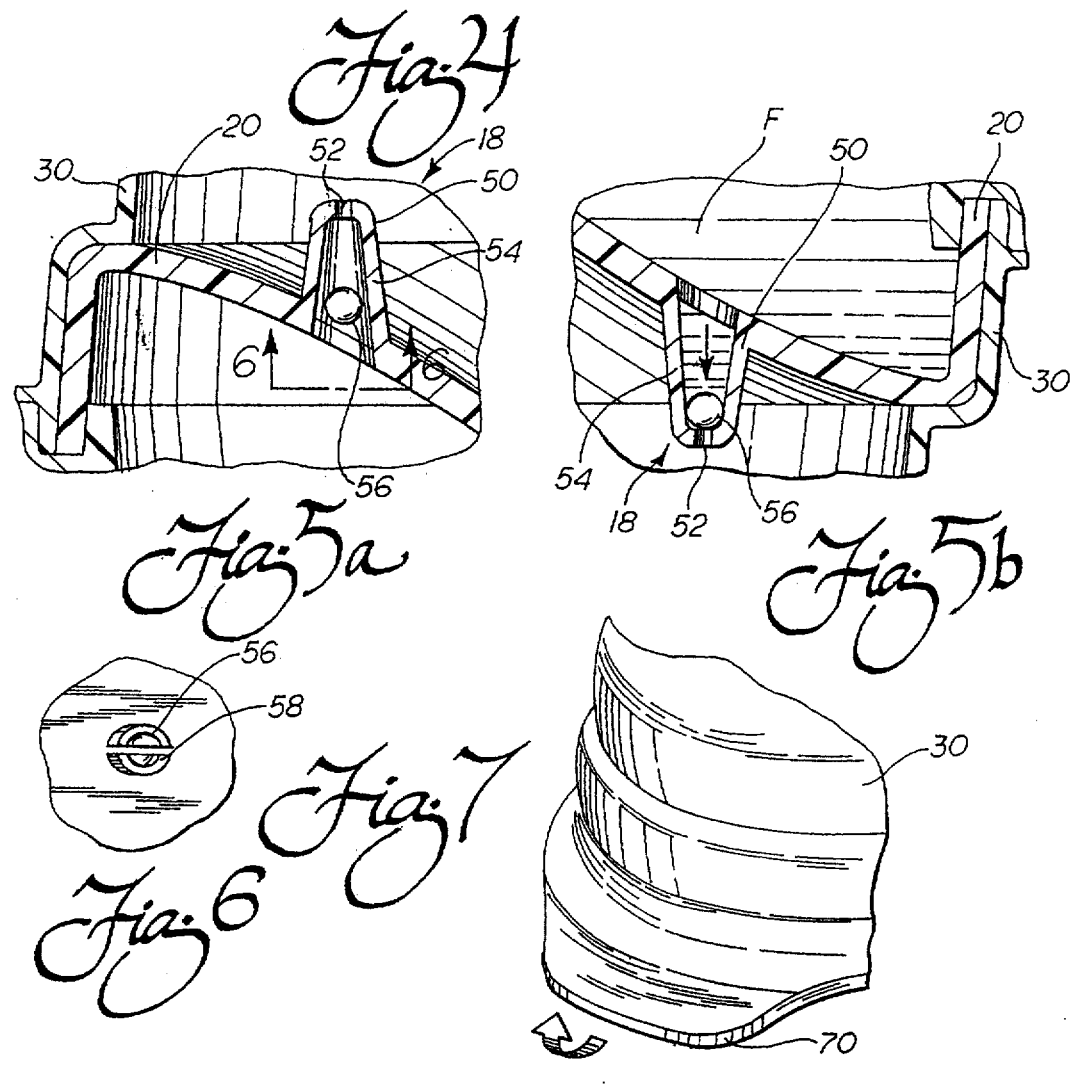

I claim:

1. A splash and spill-resistant container for holding a fluid for animal consumption, comprising:
   a base having a side wall defining a cavity for holding the fluid;
   an inverted frusto-conical partition mating in sealing engagement with said side wall of said base and dividing said cavity into first and second chambers, said partition having a flow aperture providing fluid communication between said first and second chambers; and
   a housing having an inverted channel and an aperture for accessing the fluid in said first chamber, said housing sealingly coupling with said base.

2. The container according to claim 1, wherein the degree of curvature of said inverted frusto-conical partition is substantially in the form of an inverted hyperbolic secant curve.

3. The container according to claim 1, wherein the degree of curvature of said inverted frusto-conical partition is substantially in the form of a tractrix.

4. The container according to claim 1, wherein said base has a substantially concave floor.

5. The container according to claim 4, wherein said floor of said base is provided with an peripheral support flange for elevating said floor above ground level.

6. The container according to claim 1, wherein said sidewall terminates in a ledge extending along the periphery of said base.

7. The container according to claim 6, wherein a mating groove is formed in said ledge.

8. The container according to claim 7, wherein said partition is provided with an external mating flange for insertion in said mating groove.

9. The container according to claim 8, wherein said housing is provided with a stepped flange having an inverted groove for insertion in said mating groove in said side wall of said base.

10. The container according to claim 9, wherein said stepped flange is provided with a flap for coupling with said ledge, whereby said flap forms a seal between said housing, said partition, and said base.

11. The container according to claim 1, wherein a valve is provided in said side wall of said base to permit air to escape from said second chamber.

12. The container according to claim 1, wherein a valve is provided in said partition to permit air to escape from said second chamber.

13. The container according to claim 1, wherein said inverted channel for catching fluid spills has a volume A and said first chamber has a volume B wherein $A \geq B$.

14. The container according to claim 1, wherein said housing includes a depending handle, whereby said handle is gripped and pulled upwardly to remove said housing from said base.

15. A splash and spill-resistant container for holding fluid for animal consumption, comprising:
   a base having a side wall defining a cavity for holding the fluid;
   a partition mating in sealing engagement with said side wall of said base and dividing said cavity into first and second chambers, said partition having a flow aperture providing fluid communication between said first and second chambers and a valve to permit air to escape from said second chamber; and
   a housing having an inverted channel an aperture for accessing the fluid in said first chamber, said housing sealingly coupling with said base.

16. The splash and spill-resistant container according to claim 15, wherein said valve is a ball valve, whereby said ball valve prevents fluid from flowing out of said second chamber when said container is in an inverted position.

17. The splash and spill-resistant container according to claim 15, wherein said valve includes:

a ball;

an upstanding finger projecting from said partition, said finger forming a conical channel for housing said ball and allowing air to escape from said second chamber.

18. The splash and spill-resistant container according to claim 15, wherein said housing is provided with a handle to facilitate disassembly of said container.

19. A splash and spill-resistant container for holding fluid for animal consumption, comprising:

a body having an upstanding side wall defining an interior chamber, said side wall terminating in an inverted channel forming a flange, said flange defining an access aperture;

a frusto-conical partition mating with said upstanding side wall of said body, said partition dividing said interior chamber into a first chamber and a second chamber, each of said chambers being in fluid communication through a flow aperture in said partition.

20. The container according to claim 19, wherein said partition includes a valve for permitting air to escape from said second chamber.

* * * * *

UNITED STATES PATENT AND TRADEMARK OFFICE
CERTIFICATE OF CORRECTION

PATENT NO : 5,960,740

DATED : October 5, 1999

INVENTOR(S) : Charles L. Pelsor

Page 1 of 2

It is certified that error appears in the above-identified patent and that said Letters Patent is hereby corrected as shown below:

Drawing Sheet 5 of 5, consisting of Figs. 4-7 should be deleted to appear as per attached.

Signed and Sealed this

Twenty-first Day of March, 2000

Attest:

Attesting Officer

Q. TODD DICKINSON

Commissioner of Patents and Trademarks